Aug. 10, 1965

R. W. NORDIN 3,200,408

SOUND MOTION PICTURE SYNCHRONIZING APPARATUS

Filed March 20, 1961

Inventor:
Robert W. Nordin
By Robert F. Michle
Atty.

Aug. 10, 1965 R. W. NORDIN 3,200,408
SOUND MOTION PICTURE SYNCHRONIZING APPARATUS
Filed March 20, 1961 4 Sheets-Sheet 2

Inventor:
Robert W. Nordin
By Robert F. Miehle, Jr.
Atty.

Inventor:
Robert W. Nordin

Aug. 10, 1965   R. W. NORDIN   3,200,408
SOUND MOTION PICTURE SYNCHRONIZING APPARATUS
Filed March 20, 1961   4 Sheets-Sheet 4

Inventor:
Robert W. Nordin
By Robert F. Michler Atty.

United States Patent Office 3,200,408
Patented Aug. 10, 1965

3,200,408
SOUND MOTION PICTURE SYNCHRONIZING APPARATUS
Robert W. Nordin, Skokie, Ill., assignor to Bell & Howell Company, Chicago, Ill., a corporation of Illinois
Filed Mar. 20, 1961, Ser. No. 96,895
4 Claims. (Cl. 352—14)

This invention relates to sound motion picture apparatus, and more particularly to apparatus for synchronizing the speeds of a sound drum and an intermittent film feed.

An object of the invention is to provide apparatus for advancing a film in which an intermittent drive is provided for advancing a film past an aperture and also including a sound drum past which the film is advanced continuously and a feeler pressing laterally against a loop in the film to actuate a mechanism to synchronize the rates of feed of the film over the sound drum and past the aperture.

Another object of the invention is to provide a sound motion picture camera having a sound drum rotated continuously at a predetermined speed, an intermittent feed device driven by a variable speed drive for advancing film past an aperture toward the sound drum and providing a loop therebetween and a feeler biased against the outside of the loop and positioned in accordance with the size of the loop to control the variable speed drive.

A complete understanding of the invention may be obtained from the following detailed description of a sound motion picture apparatus forming a specific embodiment thereof, when read in conjunction with the appended drawings, in which.

Figure 1:
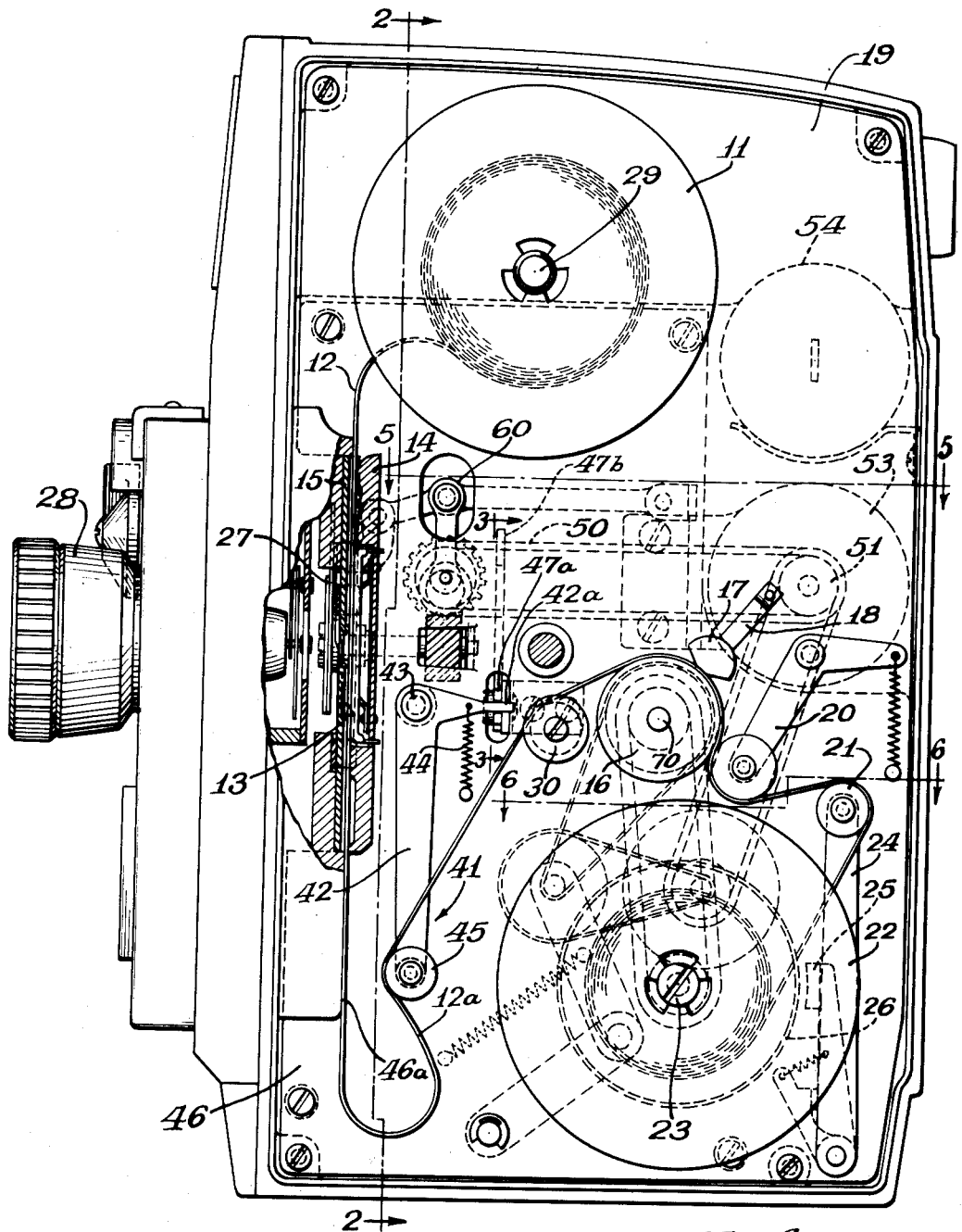
FIG. 1 is a side elevation view of a motion picture apparatus forming one embodiment of the invention with portions thereof broken away.

The invention provides a sound motion picture apparatus which may include a film gate or aperture together with an intermittent feed means for advancing a film past the gate. There is also provided a continuous feed means for advancing the film continuously from the gate past a sound head and a drive which drives one of the means at a constant speed and the other at an adjustable speed. A feeler is biased against the exterior of a loop in the film and adjusts the drive in accordance with the size of the loop to synchronize the feeds of the film by the intermittent feed and the continuous feed.

Referring now in detail to the drawings, there is shown therein a sound motion picture apparatus which in the embodiment shown is a camera. The camera includes a supply reel 11 from which film 12 is advanced by an intermittent feed or pawl 13, which also advances the film through a gate 14 and an aperture plate 15 into a U-shaped loop or slack portion 12a. A driven capstan-like sound drum 16 advances the film continuously from the loop past a known sound head 17 mounted on arm 18 mounted on mechanism plate 19 of the camera. The film travels from the sound drum past a spring biased stabilizer 20 and a guide roller 21 to a takeup reel 22 driven impositively by a yieldingly driven takeup spindle 23 as is well known in the motion picture art. The guide roller 21 is on a spring biased arm 24 to control a brake 25 operable on a brake drum 26 fixed to spindle 23. A known shutter 27 closes off light from lens 28 in synchronism with the film feed by the pawl 13. The supply reel 11 is mounted on lightly braked supply spindle 29 mounted on the mechanism plate. A freely rotatable guide roller 30 mounted on the mechanism plate guides the film from the loop 12a to the sound drum 16.

Figure 2:
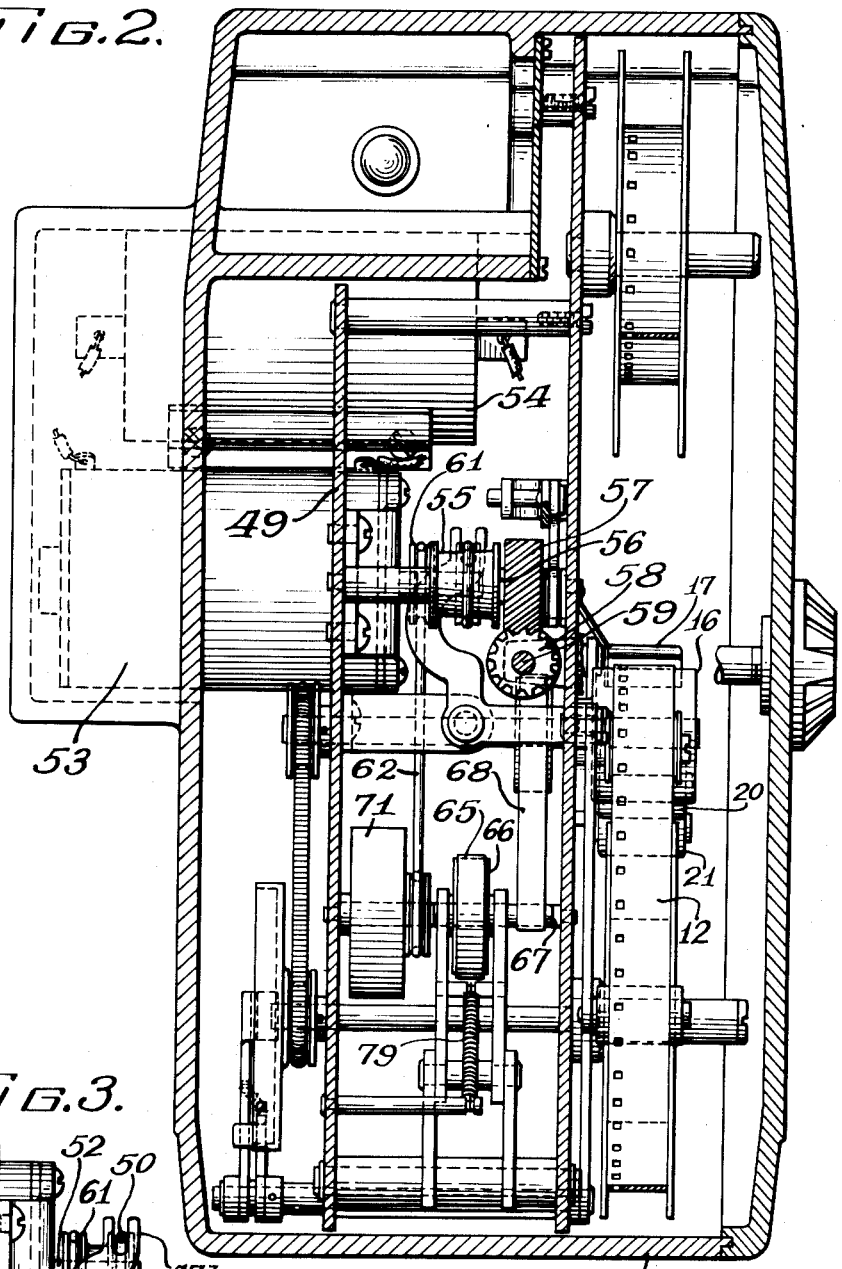
FIG. 2 is a vertical sectional view taken along line 2—2 of FIG. 1.
Figure 3:
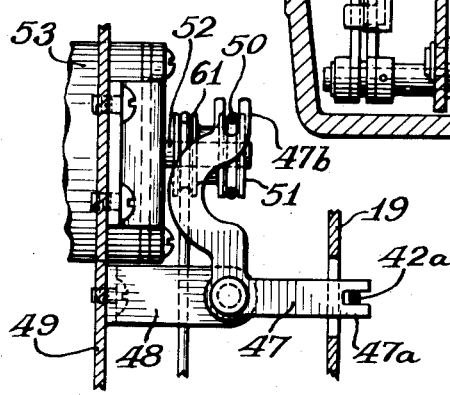
FIG. 3 is a fragmentary, vertical sectional view taken along line 3—3 of FIG. 1.
Figure 4:
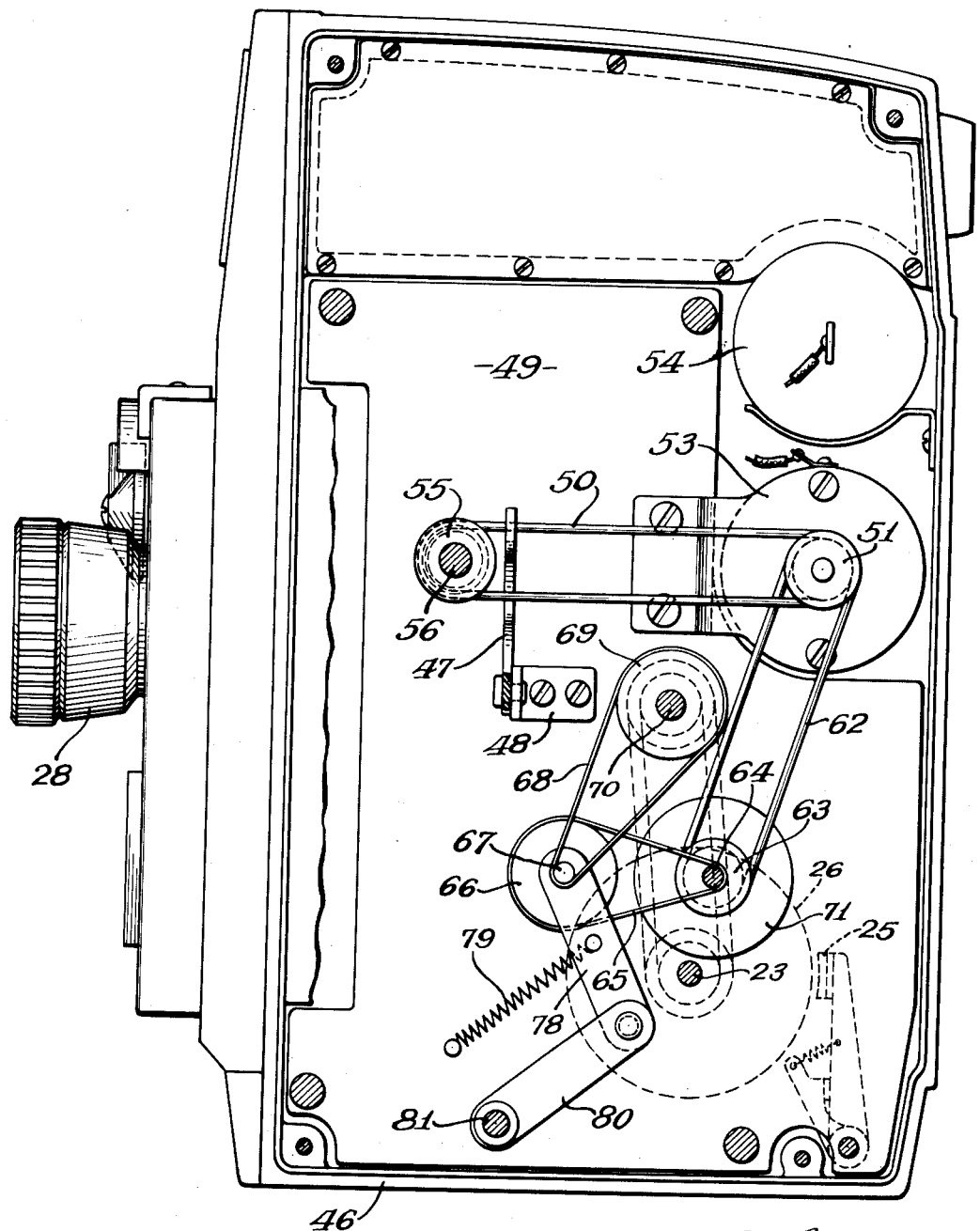
FIG. 4 is a view similar to FIG. 1 but with a vertical portion of the apparatus broken away to illustrate a drive portion of the apparatus.
Figure 5:
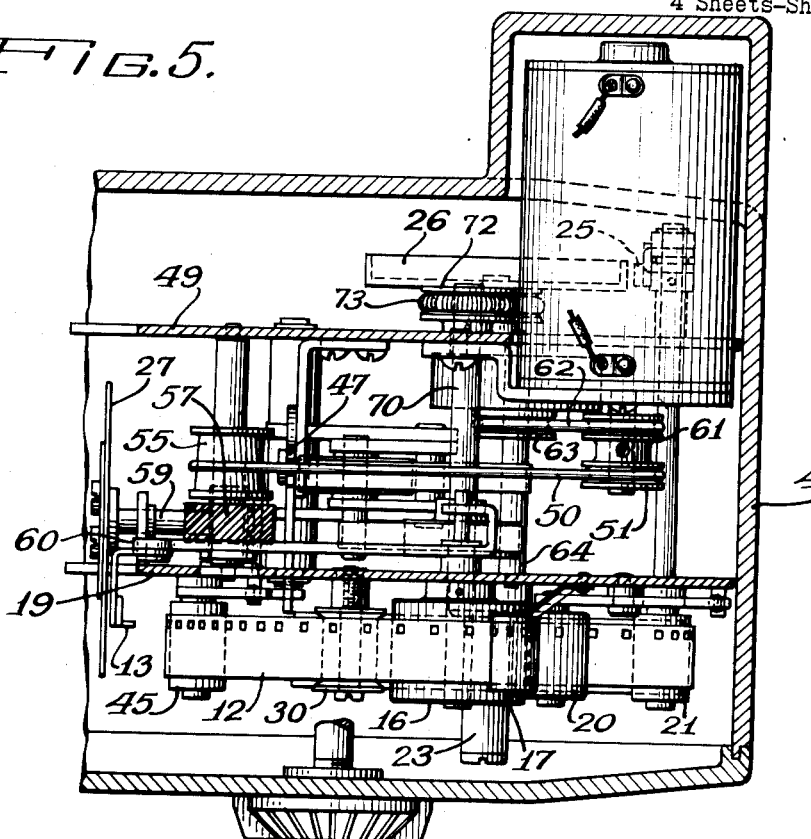
FIG. 5 is an enlarged, fragmentary horizontal sectional view taken along line 5—5 of FIG. 1.
Figure 6:
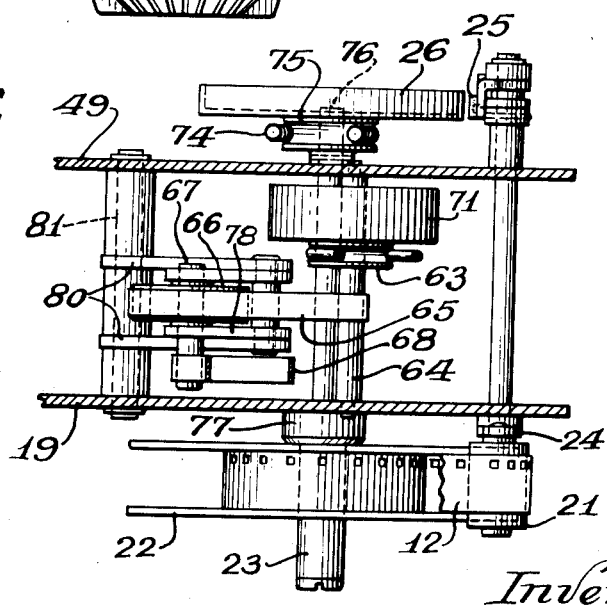
FIG. 6 is an enlarged, fragmentary horizontal view taken along line 6—6 of FIG. 1.

To synchronize the speeds of the intermittent film feed 13 and the continuously rotated drum 16, there is provided a feeler 41 including a bellcrank lever 42 mounted pivotally on pin 43 fixed to the mechanism plate 19. A spring 44 fixed to the lever 42 and the mechanism plate biases the lever 42 clockwise, as viewed in FIG. 1, to press a feeler roller 45 rotatable on the lever 42 against one side of the loop 12a, the other side of the loop being supported by wall 46a of camera housing 46. The lever 42 has a finger 42a (FIGS. 1 and 3) operably interlocked with fork 47a of lever 47 mounted pivotally on bracket 48 fixed to a second mechanism plate 49. The lever 47 has a second, belt-shifting fork 47b engaging elastic belt 50 entrained over drive pulley 51 driven by shaft 52 of electric motor 53 supplied with power from battery 54, the motor and battery being mounted on plate 49. The belt 50 also is entrained over tapered driven pulley or sheave 55 (FIGS. 2, 4 and 5) which drives shaft 56 and gears 57 and 58 to drive shaft 59 keyed to gear 58. The shaft 59 has shutter 27 keyed thereto and drives the shuttle or pawl 13 by a mechanism 60 (FIG. 5) well known in the motion picture art. The motor 53 drives the sound drum 16 continuously through drive pulley 61 (FIGS. 2, 4, 5 and 6) keyed thereto, belt 62, pulley 63, shaft 64 keyed to pulley 63, belt 65, pulley 66, shaft 67 keyed to pulley 66, belt 68, pulley 69 and shaft 70 keyed to pulley 69 and sound drum 16. Flywheel 71 is keyed to the shaft 64. The shaft 70, in addition to rotating the drum 16, continuously also drives pulley 73 to drive belt 74, pulley 75 and shaft 76 which drives the spindle 23 through a known slipping clutch mechanism 77. The brake disc 26 is keyed to the shaft 76. Linkage arms 78 (FIG. 4) are biased by spring 79 to maintain tension on the belts 65 and 68 and are pivotally connected to arms 80 pivotal on pin 81 mounted on a fixed axis by the plates 19 and 49.

In the operation of the camera described above, if the feed of the film 12 by the intermittent drive or pawl 13 and the drum 16 are synchronized, the loop 12a stays the same average size (that is the loop 12a pulsates between two fixed sizes because of the intermittent feed of the film into the loop) and the lever 42 does not change the speed of the shuttle 13. However, if the intermittent film feed is faster than the feed by the drum 16, the loop 12a lengthens and the lever 42 swings clockwise, as viewed in FIG. 1, since the loop is less stiff. This swings the lever 47 clockwise, as viewed in FIGS. 2 and 3, to shift the belt to a larger diameter portion of the tapered sheave 55 to slow the drive of the shuttle 13. Conversely, if the speed of the intermittently driven shuttle 13 is slower than that of the sound drum 16, the loop 12a shortens to raise the bottom portion of the loop and force the roller 45 to the right, as viewed in FIG. 1. This swings the lever 42 counter-clockwise to swing the lever 47 counter-clockwise, as viewed in FIGS. 2 and 3, to move the belt 50 onto a smaller diameter portion of the driven sheave or pulley 55 to increase the speed of the intermittent film feed until synchronism is reached.

While the invention is thus described, it is not wished to be limited to the precise details described, as changes may be readily made without departing from the spirit of the invention as defined in the claims.

What is claimed is:

1. In a sound motion picture camera, a mechanism plate, an aperture plate at one side of the mechanism plate, a shuttle for advancing a film intermittently along the aperture plate, a sound drum for advancing the film continuously from the aperture plate, a guide means located adjacent said aperture plate and adapted to support one leg of a free film loop between the aperture plate and sound drum, said loop having two legs and an adjoining curved portion, a feeler member comprising a roller mounted pivotally on the mechanism plate and biased against the exterior of the second leg of said film loop at a point spaced from said curved portion, first drive means for driving the shutter intermittently, second drive means for driving the sound drum continuously, and speed regulating means responsive to the variations in the position of the feeler member caused by variations in the size of the loop for synchronizing the first and second drive means.

2. In a sound motion picture apparatus, an aperture plate, a rotating member for moving film continuously relative to the aperture plate, a shuttle for advancing film intermittently along the aperture plate, a guide means positioned adjacent one end of the aperture plate between the aperture plate and the rotating member and adapted to support one leg of a free film loop having a pair of legs and an interconnecting curved portion, a feeler means mounted for movement substantially perpendicularly to the second leg of said loop at a point opposite to said guide means and spaced from said curved portion, biasing means to bias the feeler means toward said second leg, first drive means for driving said shuttle intermittently, second drive means for driving said rotating member, and means responsive to movement of the feeler means by variations in film stiffness between the legs caused by changes in the size of the loop, to regulate the speed of one of said drive means relative to the other.

3. In a sound motion picture apparatus, an aperture plate, shuttle means for intermittently advancing a film along the aperture plate, a sound head, continuous advancing means for advancing the film continuously past the sound head, means for supporting the portion of the film between the aperture plate and the continuous advancing means in a free loop, feeler means biased against an exterior side of the loop, said feeler means including a lever movable by change in size of the loop, a substantially constant speed drive for driving the continuous advancing means, an adjustable drive including a tapered roller driving member and a belt shiftable along the roller driving member for driving the shuttle means, and means responsive to the position of the feeler means caused by variations in film loop size including linkage means connected to the lever for shifting the belt along the tapered roller driving member for adjusting the adjustable drive to synchronize the feeds of the film by the shuttle means and the continuous advancing means.

4. In a sound motion picture camera, a mechanism plate, an aperture plate at one side of the mechanism plate, a shuttle for advancing a film intermittently along the aperture plate, a sound drum for advancing the film continuously from the aperture plate, guide means supporting a portion of the film between the aperture plate and the sound drum in the form of a free loop, a feeler member mounted pivotally on the mechanism plate and biased against one side of the free loop, first drive means including a tapered drive sheave and a belt shiftable along the sheave for driving the shuttle intermittently, second drive means for driving the sound drum continuously, and speed regulating means responsive to the variations in the position of the feeler member caused by variations in the size of the loop for synchronizing the first and second drive means, said speed regulating means including belt-shifting means operably connected to the feeler member.

References Cited by the Examiner

UNITED STATES PATENTS

| | | | |
|---|---|---|---|
| 1,958,152 | 5/34 | Oehmichen | 226—44 |
| 2,095,831 | 10/37 | Philips | 352—15 |
| 2,243,112 | 5/41 | Morrissey | 352—14 |

FOREIGN PATENTS 772,706  4/57  Great Britain.

NORTON ANSHER, *Primary Examiner.*

EMIL G. ANDERSON, G. Y. CUSTER, *Examiners.*